(12) United States Patent
Abdel Jalil et al.

(10) Patent No.: US 6,474,068 B1
(45) Date of Patent: Nov. 5, 2002

(54) METHOD AND APPARATUS FOR COUPLING THE OUTPUT MEMBERS OF MULTIPLE POWER SOURCES

(75) Inventors: Nashat K Abdel Jalil, Auburn Hills, MI (US); Grigory Yezersky, Farmington Hills, MI (US); Gerald Cilibraise, Livonia, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/052,403

(22) Filed: Jan. 18, 2002

(51) Int. Cl.$^7$ ................................................ F01B 21/04
(52) U.S. Cl. ..................... 60/716; 60/698; 180/65.1; 180/65.2; 180/65.4
(58) Field of Search ................ 60/698, 716; 180/65.2, 180/65.1, 65.3, 65.4, 65.5, 65.6

(56) References Cited

U.S. PATENT DOCUMENTS

| | | | |
|---|---|---|---|
| 5,318,355 A | * 6/1994 | Asanuma et al. | 303/3 |
| 5,845,731 A | 12/1998 | Buglione et al. | 180/65.2 |
| 5,908,077 A | 6/1999 | Moore | 180/65.2 |
| 5,915,488 A | * 6/1999 | Fliege | 180/65.2 |
| 6,098,733 A | * 8/2000 | Ibaraki et al. | 180/65.2 |
| 6,305,056 B1 | * 10/2001 | Moore | 475/5 |

OTHER PUBLICATIONS

U.S. Ser. No. 09/446,148 filed Dec. 17, 1999 entitled "Dual Engine Hybrid Electric Vehicle".

* cited by examiner

Primary Examiner—Hoang Nguyen
(74) Attorney, Agent, or Firm—Ralph E. Smith

(57) ABSTRACT

A method and apparatus for coupling the rotational output member of a first power source to the rotational output member of a second power source. The method controls the acceleration of the output member of the first power source until its rotational speed is equal to the rotational speed of the output member of the second power source. Thereafter, the output members are coupled and the first and second power sources are controlled such that their torque contributions are maintained at a predetermined ratio.

21 Claims, 2 Drawing Sheets

METHOD AND APPARATUS FOR COUPLING THE OUTPUT MEMBERS OF MULTIPLE POWER SOURCES

FIELD OF THE INVENTION

The present invention generally relates to power units having multiple power sources and more particularly to an apparatus and method for coupling the output members of multiple power sources.

BACKGROUND OF THE INVENTION

Engines in current production automobiles are typically sized to meet certain performance requirements. For normal city and highway driving, the engine is operated at low loads, which means low engine efficiency and high fuel consumption as a result. Several approaches have been proposed to modify the powertrain of a vehicle such that it results in higher engine efficiency. One solution that has been proposed to address this problem is disclosed in commonly assigned U.S. patent application Ser. No. 09/466, 148, the disclosure of which is hereby incorporated by reference as if fully set forth herein. This patent application discloses a hybrid vehicle having a dual engine power unit. When the vehicle is operated at a relatively modest rate, only one of the engines is employed to propel the vehicle. When the power demanded from the power unit exceeds the single engine output, the second engine is employed to supplement the power output from the power unit. Several problems have been noted with this arrangement, however.

Primarily, these problems relate to the coupling of the output members of the engines. The coupling mechanism and method should be highly reliable and provide smooth coupling that is transparent to the vehicle operator, yet be relatively inexpensive. Furthermore, the coupling mechanism and method should permit the engines to be coupled relatively quickly, so as to minimize or eliminate altogether, the lag time between the vehicle operator's demand for additional power and the delivery of additional power via the second engine.

SUMMARY OF THE INVENTION

In one preferred form, the present invention provides a method for coupling a first rotational output member to a second rotational output member. The method includes the steps of accelerating the second rotational output member at a first predetermined rate of acceleration until a rotational speed of the second rotational output member is less than a rotational speed of the first rotational output member by a first predetermined threshold; accelerating the second rotational output member at a second predetermined rate of acceleration until the rotational speed of the second rotational output member is equal to the rotational speed of the first rotational output member, the second predetermined rate of acceleration being less than the first predetermined rate of acceleration and the second predetermined threshold being less than the first predetermined threshold; and coupling the first and second rotational output members.

In another form, the present invention provides a power unit having a first power source with a first rotational output member, a second power source with a second rotational output member, a one-way clutch, a power input mechanism and a controller. The one-way clutch has a clutch input that is rotatably coupled to the second rotational output member and a clutch output. The one-way clutch is normally disengaged and does not permit torque transmission between the clutch input and the clutch output. It permits torque transmission when it is in the locked position. It is said to be in the locked position when the speed of the clutch input is the same as that of the clutch output. The power input mechanism includes a first input, which is coupled for rotation with the first rotational output member, a second input, which is coupled for rotation with the clutch output, and a transmission output, which is rotatably coupled to the transmission input member. The controller controls the first and second power sources and determines when a power demand on the transmission output exceeds a predetermined power demand threshold. In response to the determination that the power demand on the transmission output exceeds a predetermined power demand threshold, the controller controls the second power source to accelerate the second rotational output member at a first predetermined rate of acceleration until a rotational speed of the second rotational output member is less than a rotational speed of the first rotational output member by a first predetermined threshold, and thereafter accelerate the second rotational output member at a second predetermined rate of acceleration until the rotational speed of the second rotational output member is equal to the rotational speed of the first rotational output member, the second predetermined rate of acceleration being less than the first predetermined rate of acceleration and the second predetermined threshold being less than the first predetermined threshold.

In yet another preferred form, the present invention provides a method for coupling a first rotational output member to a second rotational output member. The method includes the steps of operating a first power source such that all of the torque input to a power input mechanism is supplied by the first power source; operating a second power source such that a rotational speed of the second rotational output member is matched to a rotational speed of the first rotational output member; coupling the first and second rotational output members; and simultaneously controlling the first and second power sources such that the rotational speeds of first and second rotational output members remain matched and a ratio of power supplied to the power input mechanism by the second and first power sources increases from 0:1 to a predetermined ratio.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE PREFERRED EMBODIMENTS

Figure 1:
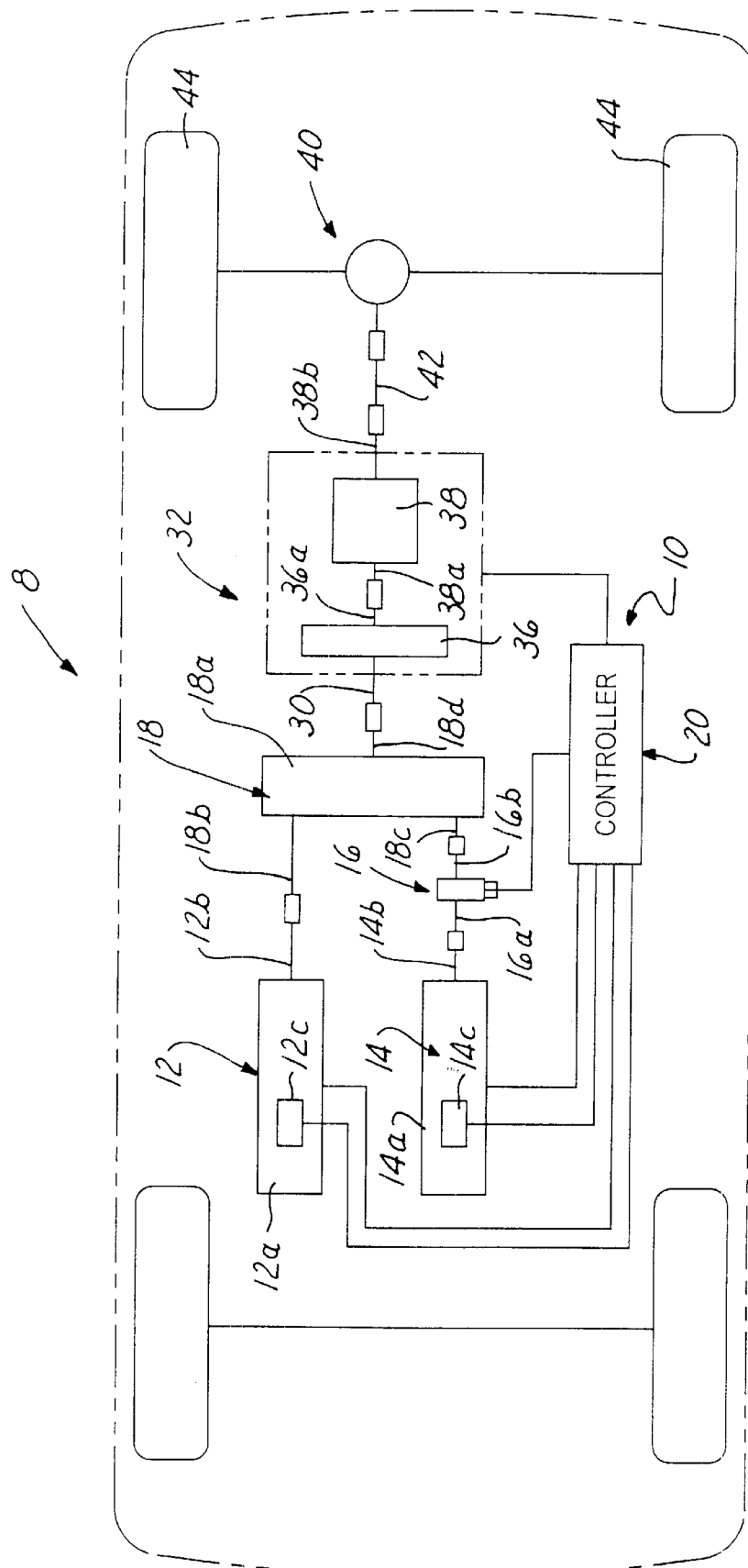
FIG. 1 is a schematic illustration of a vehicle having a power unit constructed in accordance with the teachings of the present invention.

With reference to FIG. 1 of the drawings, a vehicle 8 is schematically illustrated in operative association with a power unit 10 that is constructed in accordance with the teachings of the present invention. Those skilled in the art will understand that the incorporation of the power unit 10 into vehicle 8 is merely exemplary and that the present invention has applicability to other devices, such as boats and power generation plants. Accordingly, the particular example illustrated is not intended to limit the scope of the present invention.

The power unit 10 is schematically shown to include a first power source 12, a second power source 14, a one-way clutch 16, a power input mechanism 18 and a controller 20. The first power source 12, which is a 4-cylinder, 1.6 liter gasoline engine 12a capable of producing approximately 115 horsepower in the particular embodiment illustrated, includes a first rotational output member 12b and a conventional throttle 12c that is employed to control the mass flow of air to the engine 12a for combustion. The second power source 14, which is also is a 4-cylinder, 1.6 liter gasoline engine 14a capable of producing approximately 115 horsepower in the particular embodiment illustrated, includes a second rotational output member 14b and a conventional throttle 14c that is employed to control the mass flow of air and fuel to the engine 14a for combustion.

The one-way clutch 16 includes a clutch input member 16a, a clutch output member 16b. The clutch input member 16a is coupled for rotation with the second rotational output member 14b. The one-way clutch, when in the unlocked condition, inhibits the transmission of torque from the clutch input member 16a to the clutch output member 16b. When the one-way clutch is in the locked position, it permits the transmission of all torque that is input from the clutch input member 16a to the clutch output member 16b.

The power input mechanism 18, which is a high velocity chain drive 18a in the particular embodiment illustrated, includes a first input member 18b, a second input member 18c and a transmission output member 18d. The first input member 18b is coupled for rotation with the first rotational output member 12b. The second input member 18c is coupled for rotation with the clutch output member 16b. Rotational power received by the power input mechanism 18 through the first and second input members 18b and 18c is combined and output through the transmission output member 18d.

The transmission output member 18d is rotatably coupled to a transmission input member 30 of a transmission assembly 32, such as a commercially available 46RE transmission assembly manufactured by the DaimlerChrysler Corporation, for use in propelling the vehicle 8. In the particular embodiment illustrated, the transmission assembly 32 includes a conventional torque converter 36 and a conventional transmission 38. The transmission input member 30 rotates the torque converter 36 such that the output shaft 36a of the torque converter 36 rotates the input shaft 38a of the transmission 38. The transmission 38 includes a plurality of selectively engagable gear ratios which are interconnected with the input shaft 38a to thereby rotate the output shaft 38b of the transmission 38 at a desired speed ratio. The output shaft 38b of the transmission 38 is illustrated to be coupled to a differential assembly 40 via a prop shaft 42 to cause the wheels 44 of the vehicle 8 to rotate.

Figure 2:
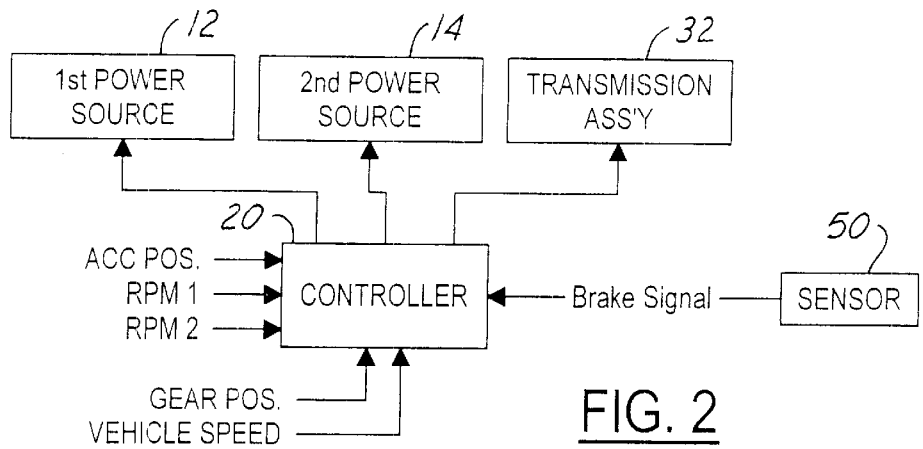
FIG. 2 is a schematic illustration of a portion of the power unit of FIG. 1 illustrating the controller in greater detail.

With additional reference to FIG. 2, the controller 20 is shown to be coupled to the first power source 12, the second power source 14, the transmission assembly 32 and preferably, a sensor 50 that produces a signal indicative of the operation of the operation of the vehicle brake system (not shown). The controller 20 is operable for monitoring a power demand on the transmission assembly 32 and controlling the first and second power sources 12 and 14, accordingly.

For example, if the power demand on the transmission assembly 32 is greater than a predetermined power demand threshold (e.g., 110 hp), the controller 20 will operate the second power source 14 such that the rotational speed of the second rotational output member 14b will be matched to the rotational speed of the first rotational output member 12b and thereafter operate the one-way clutch in the locked condition. Operation of the power unit 10 in this manner permits the power input mechanism 18 to combine the torque input to the first and second input members 18b and 18c so that substantially more power is available to the transmission assembly 32. Construction of the power unit 10 in this manner is highly advantageous in that the second power source 14 can be normally maintained in a state wherein the rotational speed of the second rotational output member 14b is zero (0), thereby permitting the power unit 10 to conserve energy until such time that the demands on the transmission assembly 32 are high enough to warrant the operation of the second power source 14.

The one-way clutch stays in the locked condition as long as the speeds of the input member and the output member of the clutch are the same. Once the power demand is less than the predetermined power demand threshold, the controller 20 executes a decoupling algorithm that will be discussed in more detail below.

Alternatively, the controller 20 may be employed to decouple the second power source 14 in response to the determination via the calculated power demand value based on the Acc. Pos. signal. In the situation when the power demand is less than a predetermined threshold, the controller 20 controls the commands to the power sources 12 and 14 such that the torque contribution of the second power source 14 is eliminated. The one-way clutch will be decoupled automatically when the speed of the input member 16a is lower than the speed of the output member 16b.

Figure 3:
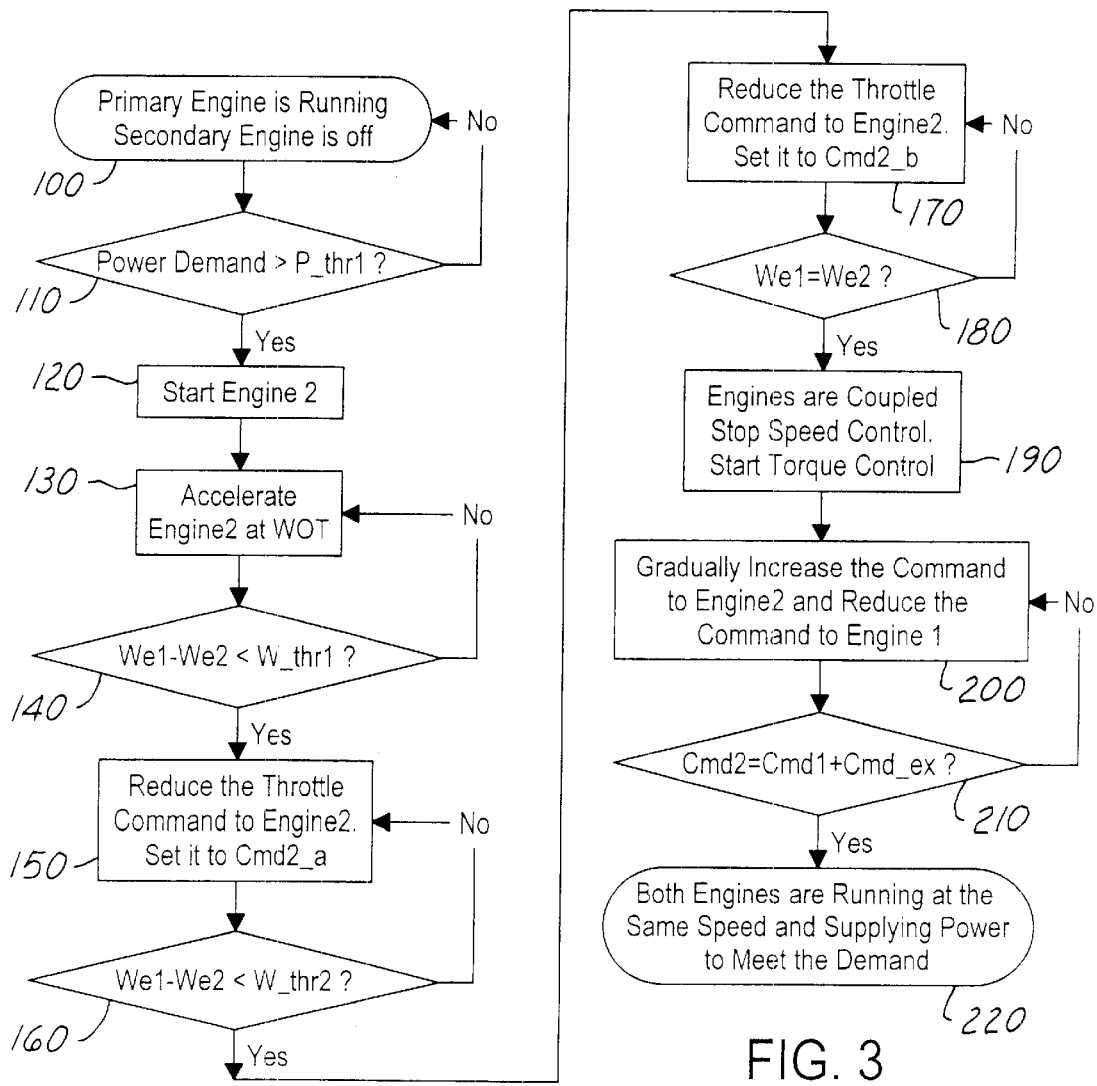
FIG. 3 is a schematic illustration in flowchart form of the methodology of the present invention.

With reference to FIG. 3, the methodology of the present invention is shown to be schematically illustrated in flowchart form. The methodology is employed by the controller 20 to control the first and second power sources 12 and 14 so that the first and second rotational output members 12b and 14b may be coupled to one another. The methodology begins at bubble 100 where the rotational speed of the first rotational output member 12b is greater than zero (0), thereby indicating that it is operational, and the rotational speed of the second rotational output member 14b is zero (0), thereby indicating that it is not operating.

The methodology proceeds to decision block 110 and determines whether the power demand exceeds a predetermined power demand threshold. If the power demand does not exceed the predetermined power demand threshold, the methodology loops back to bubble 100. If the power demand exceeds the predetermined power demand threshold in decision block 110, the methodology proceeds to block 120 where the second power source 14 is started or energized to begin the rotation of the second rotational output member 14b. The methodology then proceeds to block 130.

In block 130, the controller 20 controls the throttle 14c of the second power source 14 to a first predetermined throttle setting, such as a wide-open throttle setting, to thereby accelerate the second rotational output member 14b at a predetermined first rate of acceleration. The wide-open throttle setting is preferably employed to accelerate the second rotational output member 14b as fast as possible. The methodology then proceeds to decision block 140.

In decision block 140, the methodology compares the rotational speed of the first and second rotational output members 12b and 14b. If the rotational speed of the second rotational output member 14b is not less than the rotational speed of the first rotational output member 12b by a predetermined first threshold, the methodology loops back to block 130. The first predetermined threshold may be a value from a lock-up table that is based on the present rotational speeds of the first and second rotational output members 12a and 12b. If the rotational speed of the second rotational output member is less than the rotational speed of the first rotational output member 12b by the predetermined first threshold, the methodology proceeds to block 150.

In block 150, the controller 20 controls the throttle 14c of the second power source 14 to a second throttle setting to thereby accelerate the second rotational output member 14b at a second rate of acceleration that is less than the first rate of acceleration. The second throttle setting may be a value from a look-up table or calculated based on a predetermined algorithm, such as a PID algorithm, and the present rotational speeds of the first and second rotational output members 12b and 14b. The methodology then proceeds to decision block 160.

In decision block 160, the methodology compares the rotational speed of the first and second rotational output members 12b and 14b. If the rotational speed of the second rotational output member 14b is not less than the rotational speed of the first rotational output member 12b by a predetermined second threshold that is less than the predetermined first threshold, the methodology loops back to block 150. The second predetermined threshold may be a value from a look-up table or calculated based on a predetermined algorithm, such as a PID algorithm, and the present rotational speed of the first rotational output member 12b. If the rotational speed of the second rotational output member is less than the rotational speed of the first rotational output member 12b by the predetermined second threshold, the methodology proceeds to block 170.

In block 170, the controller 20 controls the throttle 14c of the second power source 14 to a third throttle setting to thereby accelerate the second rotational output member 14b at a third rate of acceleration that is less than the second rate of acceleration. The third throttle setting may be a value from a look-up table or calculated based on a predetermined algorithm, such as a PID algorithm, and the present rotational speeds of the first and second rotational output members 12b and 14b. The methodology then proceeds to decision block 180.

In decision block 180, the methodology compares the rotational speed of the first and second rotational output members 12b and 14b. If the rotational speed of the second rotational output member 14b is not equal to the rotational speed of the first rotational output member 12b, the methodology loops back to block 170. If the rotational speed of the second rotational output member 14b is equal to the rotational speed of the first rotational output member 12b, the methodology proceeds to block 190.

In block 190, the one-way clutch is operating in the locked condition, thereby it permits the torque that is output from the second power source 14 to be transmitted through the one-way clutch 16 to the power input mechanism 18. At this point, however, the second power source 14 is not contributing to the torque that is input to the power input mechanism 18 and the first power source is contributing all of the torque that is input to the power input mechanism 18.

The methodology proceeds to block 200 where the controller 20 controls the throttles 12c and 14c of the first and second power sources 12 and 14 in a manner which gradually changes their relative contributions of the first and second power sources 12 and 14 to the power that is input to the power input mechanism 18 in a predetermined manner. The rates at which the throttle settings are changed for the throttles 12c and 14c may be predetermined rates from a look-up table or calculated based on a predetermined algorithm, which is based on the power demand and the present rotational speeds of the first and second rotational output members 12b and 14b. The methodology then proceeds to decision block 210.

In decision block 210, the methodology determines whether the relative contributions of the first and second power sources 12 and 14 to the power input mechanism 18 have been proportioned in the predetermined manner. In the particular example provided, the first and second power sources 12 and 14 are identically configured engines 12a and 14a and as such, it is desirable that their relative contributions be equal. Accordingly, the methodology determines whether the throttle settings for the second power source 14c exceeds the throttle setting for the first power source 12c by a predetermined value. If the throttle setting for the second power source 14c does not exceed the throttle setting for the first power source 12c by a predetermined value, the methodology loops back to block 200 and the throttle settings that are employed for the first and second power sources 12 and 14 are gradually decreased and increased, respectively, in the manner described above. If the throttle settings for the throttles 12c and 14c are equal, the methodology proceeds to bubble 220 where throttle settings that are related by a predetermined ratio are employed to operate the first and second power sources 12 and 14. As mentioned above, the first and second power sources 12 and 14 are identically configured engines 12a and 14a and as such, a common throttle setting is preferably employed to ensure that the contributions of the first and second power sources 12 and 14 remain equal.

When the power demand drops below the predetermined power demand threshold, the contributions of the second power source 14 are gradually eliminated by reversing the later part of the above-referenced methodology. In this regard, the throttle settings for the first and second power sources 12 and 14 are gradually increased and decreased, respectively, and the second power source 14 is no longer contributing to the torque that is input to the power input mechanism 18. At this point, the one-way clutch is operating in the unlocked condition. Operation in this manner is advantageous in that it permits the decoupling operation to take the second power source 14 "off-line" in smooth manner which is transparent to the vehicle operator. Thereafter, the second power source 14 is preferably maintained such that the speed of the second rotational output member 14b is zero (0) so as to conserve energy.

While the power unit 10 has been described thus far as having a power sources that are identically configured engines and one-way clutch that is selectively actuatable via the controller 20, those skilled in the art will appreciate that the invention, in its broader aspects, may be constructed somewhat differently. For example, other rotary power sources, such as motors or flywheels, may be substituted for one or both of the engines.

As another example, the power output of the first and second power sources 12 and 14 need not be equal. If the first and second power sources 12 and 14 are engines, for example, the controller 20 can be programmed to control the throttle 14c of the second power source 14 relative to the throttle 12c of the first power source 12 through predetermined relationship to maintain the rotational speed of the second rotational output member 14b equal to the rotational speed of the first rotational output member 12b. Where the first and second power sources 12 and 14 are identically configured, this relationship is about 1:1.

If the first and second power sources 12 and 14 are electric motors, for example, the controller 20 can be programmed to control the magnitudes of the voltage and current that is supplied to the second power source 14 relative to the magnitudes of the voltage and current that is supplied to the first power source 12 through predetermined relationship to maintain the rotational speed of the second rotational output member 14b equal to the rotational speed of the first rotational output member 12b. Again, where the first and second power sources 12 and 14 are identically configured, this relationship is about 1:1.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. In an apparatus having a first power source and a second power source, the first power source having a first rotational output member, the second power source having a second rotational output member, a method for coupling the first and second rotational output members, the method comprising the steps of:

accelerating the second rotational output member at a first predetermined rate of acceleration until a rotational speed of the second rotational output member is less than a rotational speed of the first rotational output member by a first predetermined threshold;

accelerating the second rotational output member at a second predetermined rate of acceleration until the rotational speed of the second rotational output member is equal to the rotational speed of the first rotational output member, the second predetermined rate of acceleration being less than the first predetermined rate of acceleration and the second predetermined threshold being less than the first predetermined threshold; and coupling the first and second rotational output members.

2. The method of claim 1, wherein the rotational output speed of the second power source is normally zero (0) and the method further comprises the step of operating the second power source when a power demand of the apparatus exceeds a predetermined power threshold.

3. The method of claim 2, wherein the second power source is an engine.

4. The method of claim 3, wherein prior to the step of accelerating the second rotational output member at the first predetermined rate of acceleration, the method comprises the step of accelerating the second rotational output member at a third predetermined rate of acceleration until a rotational speed of the second rotational output member is less than a rotational speed of the first rotational output member by a third predetermined threshold, the third predetermined rate of acceleration being greater than the first predetermined rate of acceleration and the third predetermined threshold being greater than the first predetermined threshold.

5. The method of claim 3, wherein the third predetermined rate of acceleration corresponds to a wide-open throttle position.

6. The method of claim 3, wherein the first power source is an engine.

7. The method of claim 6, wherein after the step of coupling the first and second rotational output members includes the step of controlling a throttle of the second power source relative to a throttle of the first power source through predetermined relationship to maintain the rotational speed of the second rotational output member equal to the rotational speed of the first rotational output member.

8. The method of claim 7, wherein the predetermined relationship is about 1:1.

9. The method of claim 1, wherein the step of coupling the first and second rotational output members includes the steps of:

providing a power input mechanism with a first input and a second input;

coupling the first rotational output member to the first input;

providing a one-way clutch having a clutch input and a clutch output, the clutch output being coupled to the second input, the clutch input being coupled to the second rotational output member, the one-way clutch permits torque transmission between the clutch input and the clutch output only when the clutch is in the locked position.

10. The method of claim 9, further comprising the steps of:

determining whether a power demand of the apparatus is less than or equal to a predetermined power threshold; and controlling the throttle settings of the power sources so that the one-way clutch is disengaged and it does not permit torque transmission between the clutch input and the clutch output.

11. The method of claim 10, wherein after the step of disengaging the one-way clutch, the method includes the step of controlling the second power source such that the rotational output speed of the second power source is zero (0).

12. The method of claim 1, wherein the step of coupling the first and second rotational output members includes the steps of:

providing a power input mechanism with a first input and a second input;

coupling the first rotational output member to the first input;

providing a one-way clutch having a clutch input and a clutch output, the one-way clutch being operable in an unlocked condition, which inhibits torque transmission between the clutch input and the clutch output, and a locked condition, which permits torque transmission between the clutch input and the clutch output, the one-way clutch being normally maintained in the unlocked condition, the one-way clutch operating in the locked condition when the speed of the clutch input is exactly the same as the speed of the clutch output; and controlling the second power source such that the one-way clutch is maintained in the locked condition.

13. A power unit comprising:
- a first power source having a first rotational output member;
- a second power source having a second rotational output member;
- a one-way clutch having a clutch input and a clutch output, the clutch input being rotatably coupled to the second rotational output member, the one-way clutch being operable in an unlocked condition, which inhibits torque transmission between the clutch input and the clutch output, and a locked condition, which permits torque transmission between the clutch input and the clutch output;
- a power input mechanism with a first input, a second input and a transmission output, the first input being coupled for rotation with the first rotational output member, the second input being coupled for rotation with the clutch output, the transmission output being rotatably coupled to the transmission input member; and
- a controller for controlling the first power source and the second power source, the controller determining when a power demand on the transmission exceeds a predetermined power demand threshold and in response thereto, controls the second power source to accelerate the second rotational output member at a first predetermined rate of acceleration until a rotational speed of the second rotational output member is less than a rotational speed of the first rotational output member by a first predetermined threshold, and thereafter accelerate the second rotational output member at a second predetermined rate of acceleration until the rotational speed of the second rotational output member is equal to the rotational speed of the first rotational output member, the second predetermined rate of acceleration being less than the first predetermined rate of acceleration and the second predetermined threshold being less than the first predetermined threshold, and thereafter control the one-way clutch, indirectly, to operate in the locked condition.

14. The power unit of claim 13, wherein the second power source is an engine.

15. The power unit of claim 13, wherein the first power source is an engine.

16. The power unit of claim 15, wherein the second power source is an engine and wherein the controller controls a throttle of the second power source relative to a throttle of the first power source through predetermined relationship to maintain the rotational speed of the second rotational output member equal to the rotational speed of the first rotational output member.

17. The power unit of claim 16, wherein the predetermined relationship is about 1:1.

18. The power unit of claim 13, wherein the power input mechanism is a high velocity chain drive.

19. In a power unit having a first power source, a second power source and a power input mechanism, the first power source having a first rotational output member for inputting a first torque to the power input mechanism, the second power source having a second rotational output member for inputting a second torque to the power input mechanism, a method for coupling the first and second rotational output members, the method comprising the steps of:
- operating the first power source such that all of the torque input to the power input mechanism is supplied by the first power source;
- operating the second power source such that a rotational speed of the second rotational output member is matched to a rotational speed of the first rotational output member;
- coupling the first and second rotational output members; and
- simultaneously controlling the first and second power sources such that the rotational speeds of first and second rotational output members remain matched and a ratio of power supplied to the power input mechanism by the second and first power sources increases from 0:1 to a predetermined ratio.

20. The method of claim 19, wherein the predetermined ratio is about 1:1.

21. The method of claim 19, wherein the first power source is a first engine having a first throttle and the second power source is a second engine having a second throttle, and wherein after the ratio of power supplied to the power input mechanism by the second and first power sources increases to the predetermined ratio, the method further comprises the step of controlling the second throttle at a predetermined ratio relative to the first throttle.

* * * * *